US009769115B2

(12) United States Patent
Nantel

(10) Patent No.: US 9,769,115 B2
(45) Date of Patent: Sep. 19, 2017

(54) DHCP AGENT ASSISTED ROUTING AND ACCESS CONTROL

(71) Applicant: Fortinet, Inc., Sunnyvale, CA (US)

(72) Inventor: Mathieu Nantel, Blainville (CA)

(73) Assignee: Fortinet, Inc., Sunnyvale, CA (US)

( * ) Notice: Subject to any disclaimer, the term of this patent is extended or adjusted under 35 U.S.C. 154(b) by 186 days.

(21) Appl. No.: 14/695,282

(22) Filed: Apr. 24, 2015

(65) Prior Publication Data

US 2016/0315907 A1  Oct. 27, 2016

(51) Int. Cl.
*G06F 15/16* (2006.01)
*H04L 29/12* (2006.01)
*H04L 12/28* (2006.01)
*H04L 29/06* (2006.01)

(52) U.S. Cl.
CPC ...... *H04L 61/2015* (2013.01); *H04L 12/2801* (2013.01); *H04L 29/12018* (2013.01); *H04L 29/12028* (2013.01); *H04L 63/0227* (2013.01); *H04L 61/103* (2013.01); *H04L 61/6022* (2013.01); *H04L 63/20* (2013.01)

(58) Field of Classification Search
CPC ......... H04L 29/12018; H04L 29/12028; H04L 12/2801; H04L 12/2856; H04L 63/20; H04L 63/0823

USPC .......... 709/245, 229, 225; 370/401, 395.32; 726/1
See application file for complete search history.

(56) References Cited

U.S. PATENT DOCUMENTS

| | | | |
|---|---|---|---|
| 6,862,286 B1* | 3/2005 | Tams | H04L 29/12018 370/395.32 |
| 7,827,310 B1* | 11/2010 | Haberman | H04L 29/12028 709/245 |
| 2002/0013844 A1* | 1/2002 | Garrett | H04L 12/2801 709/225 |
| 2014/0304765 A1* | 10/2014 | Nakamoto | H04L 63/20 726/1 |

* cited by examiner

*Primary Examiner* — Kyung H Shin
(74) *Attorney, Agent, or Firm* — Hamilton, DeSanctis & Cha LLP

(57) ABSTRACT

Systems and methods for increasing layer 2 visibility of layer 3 network devices so as to facilitate implementation of device-oriented policy actions by layer 3 network devices are provided. According to one embodiment, unique physical addresses of one or more host devices are retrieved by a dynamic host configuration protocol (DHCP) agent that is operatively coupled with a DHCP server. The physical addresses are mapped to corresponding Internet Protocol (IP) addresses assigned by the DHCP server to the one or more host devices. The mapping is relayed directly or indirectly to a network security device. Network traffic management/security policies are defined within the network security device corresponding to at least one of the unique physical addresses.

16 Claims, 6 Drawing Sheets

FIG. 4A — 400

| DYNAMIC HOST CONFIGURATION PROTOCOL (DHCP) AGENT ||
|---|---|
| IP ADDRESS | MAC ADDRESS |
| 192.168.0.181 | 00-AC-1C-14-F9-0B |
| 192.168.0.182 | 00-AC-20-9B-B3-54 |
| 192.168.0.192 | 00-AC-2B-D5-C7-F4 |
| 192.168.0.197 | 00-AC-2F-E7-3D-EE |
| ... | ... |
| 192.168.0.216 | 00-AC-9F-61-D9-01 |
| 192.168.0.217 | 00-AC-A2-0D-E8-EC |

IP TO MAC ADDRESSES MAPPING (SCENARIO 1) →

FIG. 4B — 420

| IP ADDRESS | MAC ADDRESS | POLICY RULE |
|---|---|---|
| 192.168.0.181 | 00-AC-1C-14-F9-0B | Rule_725 |
| 192.168.0.182 | 00-AC-20-9B-B3-54 | Rule_726 |
| 192.168.0.192 | 00-AC-2B-D5-C7-F4 | Rule_645 |
| 192.168.0.197 | 00-AC-2F-E7-3D-EE | Rule_423 |
| ... | ... | ... |
| 192.168.0.216 | 00-AC-9F-61-D9-01 | Rule_332 |
| 192.168.0.217 | 00-AC-A2-0D-E8-EC | Rule_337 |

CHANGE IN DYNAMIC IP ADDRESSES (SCENARIO 2) ↓

FIG. 4C — 440

| DYNAMIC HOST CONFIGURATION PROTOCOL (DHCP) AGENT ||
|---|---|
| IP ADDRESS | MAC ADDRESS |
| 192.168.0.170 | 00-AC-1C-14-F9-0B |
| 192.168.0.165 | 00-AC-20-9B-B3-54 |
| 192.168.0.192 | 00-AC-2B-D5-C7-F4 |
| 192.168.0.197 | 00-AC-2F-E7-3D-EE |
| ... | ... |
| 192.168.0.188 | 00-AC-9F-61-D9-01 |
| 192.168.0.187 | 00-AC-A2-0D-E8-EC |

UPDATION OF IP TO MAC ADDRESSES MAPPING (SCENARIO 2) →

FIG. 4D — 460

| IP ADDRESS | MAC ADDRESS | POLICY RULE |
|---|---|---|
| 192.168.0.170 | 00-AC-1C-14-F9-0B | Rule_725 |
| 192.168.0.165 | 00-AC-20-9B-B3-54 | Rule_726 |
| 192.168.0.192 | 00-AC-2B-D5-C7-F4 | Rule_645 |
| 192.168.0.197 | 00-AC-2F-E7-3D-EE | Rule_423 |
| ... | ... | ... |
| 192.168.0.188 | 00-AC-9F-61-D9-01 | Rule_332 |
| 192.168.0.187 | 00-AC-A2-0D-E8-EC | Rule_337 |

DHCP AGENT ASSISTED ROUTING AND ACCESS CONTROL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to the field of network security. More particularly, embodiments of the present invention relate to systems and methods for facilitating accurate implementation of device-oriented policy actions by a layer 3 network device by relaying information contained in Dynamic Host Configuration Protocol (DHCP) leases to the layer 3 network device.

Description of the Related Art

Conventional communication systems connect thousands of personal computers (PCs) and other network devices adapted to communicate using the open system interconnection (OSI) model. Often, a smaller number of computers are linked to form a local area network (LAN), or a wide area network (WAN). LANs, WANs, and other networks are generally referred to as sub-networks. One larger communication network is the Internet, which interconnects millions of computers, LANs, WANs and other sub-networks.

In a computer network, devices, such as firewalls, switches and routers, operating at layer 3 of the OSI model play an essential role in filtering/routing data packets to the right hosts/destination devices. For example, a firewall protects computing devices residing behind the firewall from suspicious network activities and analyzes/controls traffic flows when the computing devices that are protected by firewall attempt to communicate with devices external to the protected network. Typically, one or more firewalls are placed at the gateway of a local area network (LAN) through which all traffic originated external to the protected network must flow before reaching the internal computing devices. Firewalls are placed to protect individual computing devices, servers, data centers etc. of a private network or LAN from malicious content and/or network attacks when these protected devices within the private network connect to the Internet. A router, another example of a layer-3 device, is also typically placed between networks. Routers serve as intermediate destinations for network traffic. They receive and evaluate incoming packets to identify the source and destination address and then forward the packets onto an appropriate interface based on their routing tables to ensure the packets reach their intended destination.

Conventional Layer-3 devices analyze, filter and/or route data traffic based on predefined policy rules, which are largely based on layer-3 information (e.g., Internet Protocol (IP) addresses of the source and/or destination devices), wherein such IP addresses are read by the layer-3 devices from received data packets without affecting the integrity of packets, based on which one or more policy rules may be applied to block/allow and/or route the data packets toward the destination IP address. Most of such decisions are therefore taken by the devices based on layer-3 information that they can retrieve from the data packets. However, IP address based decisions may not always work in relation to implementation of persistent controls intended to be applied to a specific endpoint as the IP address assigned to a particular endpoint may change over time as a result of normal operation of DHCP.

In a private network or LAN, a DHCP server automatically and dynamically assigns IP addresses to computing devices, and maintains a database of IP addresses assigned to different computing devices. Every computing device has its own physical address, called the Media Access Control (MAC) address that is assigned to the computing device at the time of manufacturing in order to uniquely identify the computing device. The DHCP server maintains a database of IP addresses and corresponding MAC addresses of the computing devices to which it has dynamically assigned IP addresses. It is possible that at different times, a given IP address may be assigned to different computing devices using the DHCP protocol, and therefore it is not possible to permanently refer and uniquely identify a specific computing device based on its currently assigned IP address.

Existing network devices have limited layer-2 visibility into host devices that they protect and filter content for, especially in larger, routed environments. This results in inability for the network devices to adequately implement persistent controls on behalf of a specific endpoint protected by the devices. Controls that benefit from layer 2 visibility include network access control (NAC), quarantining of hosts violating policies and operating system and device type visibility in logging and reporting tools.

There is therefore a need for methods and systems that enable a layer-3 network device to have increased layer 2 visibility.

SUMMARY

Systems and methods are described for increasing layer 2 visibility of layer 3 network devices so as to facilitate implementation of device-oriented policy actions by layer 3 network devices. According to one embodiment, unique physical addresses of one or more host devices are retrieved by a dynamic host configuration protocol (DHCP) agent that is operatively coupled with a DHCP server. The physical addresses are mapped to corresponding Internet Protocol (IP) addresses assigned by the DHCP server to the one or more host devices. The mapping is relayed directly or indirectly to a network security device. Network traffic management/security policies are defined within the network security device corresponding to at least one of the unique physical addresses.

Other features of embodiments of the present invention will be apparent from the accompanying drawings and from the detailed description that follows.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIGS. 4A-D collectively illustrate how assignment of an IP address to a MAC address and changes thereto are tracked by a layer 3 network device in accordance with an embodiment of the present invention.

DETAILED DESCRIPTION

Figure 1:
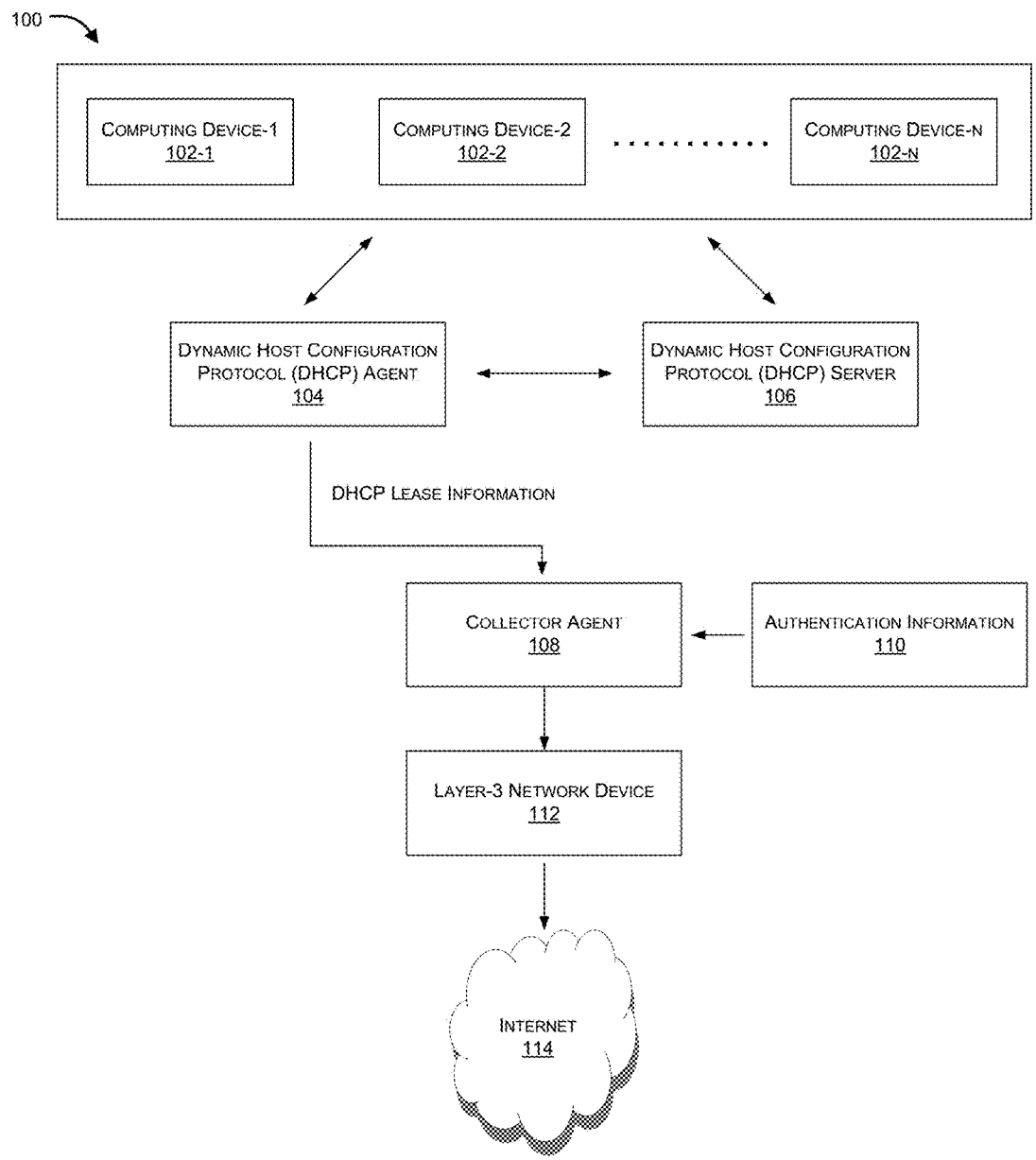
FIG. 1 illustrates an exemplary network architecture including a DHCP agent configured to relay DHCP lease information to a layer 3 network security device in accordance with an embodiment of the present invention.

Systems and methods are described for increasing layer 2 visibility of layer 3 network devices so as to facilitate implementation of device-oriented policy actions by layer 3 network devices. Embodiments of the present invention generally relate to the field of network security. More particularly, embodiments of the present invention relate to systems and methods for facilitating accurate implementation of device-oriented policy actions by a layer 3 network device by relaying information contained in Dynamic Host Configuration Protocol (DHCP) leases to the layer 3 network device.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

In an embodiment, a system of the present invention can include a physical address collection module configured at a dynamic host configuration protocol (DHCP) agent that is operatively coupled with a DHCP server to retrieve unique physical addresses (layer-2 information such as MAC addresses) of one or more host devices and map them with corresponding Internet Protocol (IP) addresses assigned by the DHCP server to the one or more host devices. The system can further include a physical address information forwarding module configured to enable the DHCP agent to relay the mapped unique physical addresses (layer-2 information such as MAC addresses) of one or more host devices to a network security device. System of the present disclosure can further include a physical address based network policy definition module configured at the network security device (layer-3 device) to define network traffic management/security policies corresponding to at least one of the unique physical addresses (layer-2 information such as MAC addresses) of the one or more host devices, enabling visibility of layer-2 information at layer-3 devices. In an aspect, system of the present disclosure can further include a network policy based traffic management module configured to manage traffic to/from the one or more host devices based on corresponding network traffic management/security policies.

In an aspect, a network security device can include, but is not limited to, a firewall, a router, a hub, a gateway device, a switch, and a traffic management/control device. In another aspect, the network security device can update a mapping between IP addresses and the physical addresses of the one or more host devices in real-time based on relay information received from the DHCP agent. In another aspect, the network traffic management/security policies can be configured to perform any or a combination of network access control (NAC), identifying/quarantining of host devices that violate policies, logging and reporting information, among any other configured function/feature that requires security policies defined for host devices.

In another aspect, a system of the present invention can include at least one collector agent configured to collect relay information (from the DHCP agent(s)) having mapped unique physical addresses, and then forward the desired/configured information to the network security device. The collector agent can be further configured to aggregate the relay information with authentication information stored therein before forwarding the aggregated information to the network security device.

In an embodiment, a method of the present invention can include retrieving, at a dynamic host configuration protocol (DHCP) agent that is operatively coupled with a DHCP server, unique physical addresses (such as MAC addresses) of one or more host devices and mapping the retrieved physical addresses with corresponding Internet Protocol (IP) addresses assigned by the DHCP server to the one or more host devices; enabling the DHCP agent to relay the mapped unique physical addresses of one or more host devices to a network security device; and defining, at the network security device, network traffic management/security policies corresponding to at least one of the unique physical addresses of the one or more host devices.

FIG. 1 illustrates an exemplary network architecture 100 including a DHCP agent 104 configured to relay DHCP lease information to a layer 3 network security device 112 in accordance with an embodiment of the present invention. As can be seen, aspects of the present disclosure provide for a dynamic host configuration protocol (DHCP) agent 104 that is operatively coupled with one or more computing devices such as 102-1, 102-2, ..., 102-n, which may be collectively referred to as computing devices/clients/host devices 102 hereinafter, and further coupled with a DHCP server 106. Dynamic Host Configuration Protocol (DHCP) is a network protocol for enabling a server, such as server 106, to assign and manage IP addresses for computers 102 (or clients or hosts) connected to an Internet Protocol (IP) network. Typically, a DHCP server 106 assigns IP addresses from a defined range of numbers often referred to as a scope or IP address pool, which can span multiple subnets. Multiple IP address ranges from the various subnets can be assigned to the DHCP server 106 for allocation to clients. When a DHCP server 106 receives a request from a client 102 for an IP address, the DHCP server 106 randomly (or based on some defined algorithm) selects a free IP address from the various subnets available and allocates that IP address to client 102.

Aspects of the present disclosure enable the DHCP agent 104 to retrieve unique physical addresses of one or more host devices 102 and map them with corresponding Internet Protocol (IP) addresses assigned by the DHCP server 106 to the one or more host devices 102. Agent 104 can therefore retrieve unique physical addresses such as MAC addresses of one or more host devices such as 102-1, 102-2, ..., 102-n and then map them with the IP address that have been assigned to each such device 102 by server 106. As the IP address allocated to each host device 102 is dynamic, agent 104 can be configured to keep the mapping information between MAC addresses of the host devices and the assigned IP addresses updated at all times. Maintaining of the mapping information can be done in real-time or dynamically or at defined/configured periodic intervals.

According to an embodiment, a system of the present disclosure can be configured to enable DHCP agent 104 to relay the mapped unique physical addresses of one or more host devices 102 to a network security device 112. Such information can be sent as DHCP relay lease information. Based on such relay information, network security device 112 can be configured to define network traffic management/security policies corresponding to the unique physical addresses of the one or more host devices, enabling visibility of layer-2 information, such as fixed MAC addresses of devices 102, at layer-3 devices 112, such as routers/hubs/switches/gateway devices/firewalls/among other network devices 112.

According to one embodiment, relay lease information can be sent by DHCP agent 104 first to a collector agent 108, which can then verify/aggregate/correlate the received relay information having IP-MAC address mapping with additional authentication information 110 stored therewith to then send desired/updated mapping information to layer-3 network device 112 (e.g., a firewall), which can then define network security policies such as packet filter policies for one or more specific host devices 102 so that incoming/outgoing packets from/to the Internet 114 can be routed/processed by layer-3 network device 112 accordingly.

According to one embodiment, DHCP agent 104 addresses layer-2 visibility restrictions by enabling agent 104 to run on various DHCP implementations (e.g., Microsoft Windows servers) and relay information contained in DHCP leases to network devices 112 so that the information may be used to address layer-2 visibility along with ensuring controls, such as NAC, host quarantine and visibility that can benefit from the accuracy that comes with layer 2 visibility (specifically, MAC address to IP address relationships). As firewalls 112 are generally operating as layer-3 controls (using IP address), this added visibility can provide device-oriented policy actions with accuracy, which is, in existing platforms, restricted to layer-2 adjacent devices. As network device(s) 112 can define host device 102 specific security policies based on the MAC addresses of host devices 102, changes in IP addresses assigned by server 106 to devices 102 does not impact the policy defined by network device 112 as it is defined using the physical address of the devices 102 and is therefore static.

In an exemplary implementation, DHCP agent 104 can forward DHCP leases to a Single Sign-On (SSO) collector agent 108, which can aggregate DHCP lease information with existing SSO information (from say 110), and forward this data to network/security/layer-3 devices 112, which can use this enhanced information to enforce accurate NAC, quarantining and logging. Network devices 112 can also exchange such physical address/MAC address information of host devices 102 with one or more other network security/manager devices in order to allow for adequate centralized logging and reporting, and to provide an ability for other units/modules managed by the network management device(s) to query the device(s) for new detected devices (using their MAC address) in order to obtain their current posture as it relates to NAC, quarantining or other policy status that may related to the device in question.

According to another embodiment, DHCP agent 104 can further be configured to retrieve additional information about host/computing device 102 activities and transmit the same as relay information to collector agent 108 and/or layer-3 device 112.

Figure 2:
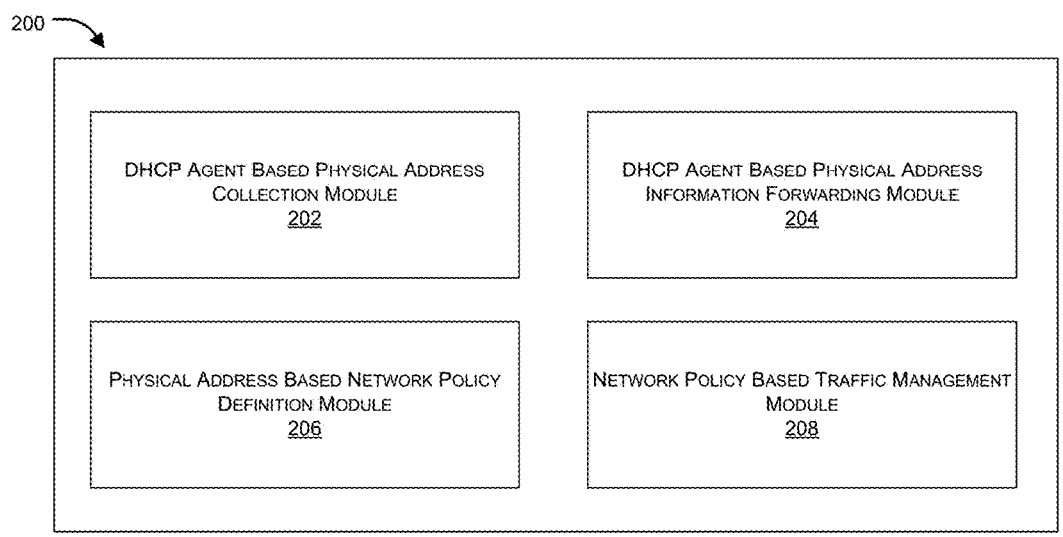
FIG. 2 illustrates exemplary functional modules of a DHCP agent in accordance with an embodiment of the present invention.

FIG. 2 illustrates exemplary functional modules 200 of a DHCP agent and a network device in accordance with an embodiment of the present invention. One should appreciate that although the functional modules of FIG. 2 are partially implemented by a DHCP agent and partially by a network device such as firewall/router, this is purely a logical representation, and one or more modules can be implemented in different devices/components, and can also be configured as sub-modules or a group module. All such modules and architectures/configuration and therefore completely within the scope of the present disclosure. In an aspect, the proposed architecture can include a DHCP agent that is operatively coupled with a DHCP server and is configured to implement a physical address collection module 202 to retrieve unique physical addresses of one or more host devices and map them with corresponding Internet Protocol (IP) addresses assigned by the DHCP server to the one or more host devices. Module 202 therefore enables the DHCP agent to retrieve the MAC/physical addresses of one or more desired host devices and map them with the currently assigned corresponding IP addresses of such host devices. Module 202 can further be configured to change the mapping as and when the IP addresses assigned by the DHCP server to the host devices are changed. DHCP agent can further be configured to implement a physical address information forwarding module 204 configured to relay the mapped unique physical addresses of one or more host devices to a network security device. In an implementation, module 204 can be configured to transmit a mapping of MAC address and currently assigned IP address of one or more desired host devices to the network security device.

In an aspect, the network security device can implement/incorporate a physical address based network policy definition module 206 that is configured to define network traffic management/security policies corresponding to at least one of the unique physical addresses of the one or more host devices. Module 206 therefore enables the network security device to use the MAC addresses of the one or more host devices to define security policies for the host devices such that even if the IP addresses of the host devices change, the security policies for the host devices can be continued to be used as they are defined based on the static MAC/physical address of the host devices. In another aspect, the network security device can further include/incorporate a network policy based traffic management module 208 that is configured to manage traffic to/from the one or more host devices based on corresponding network traffic management/security policies.

Figure 3:
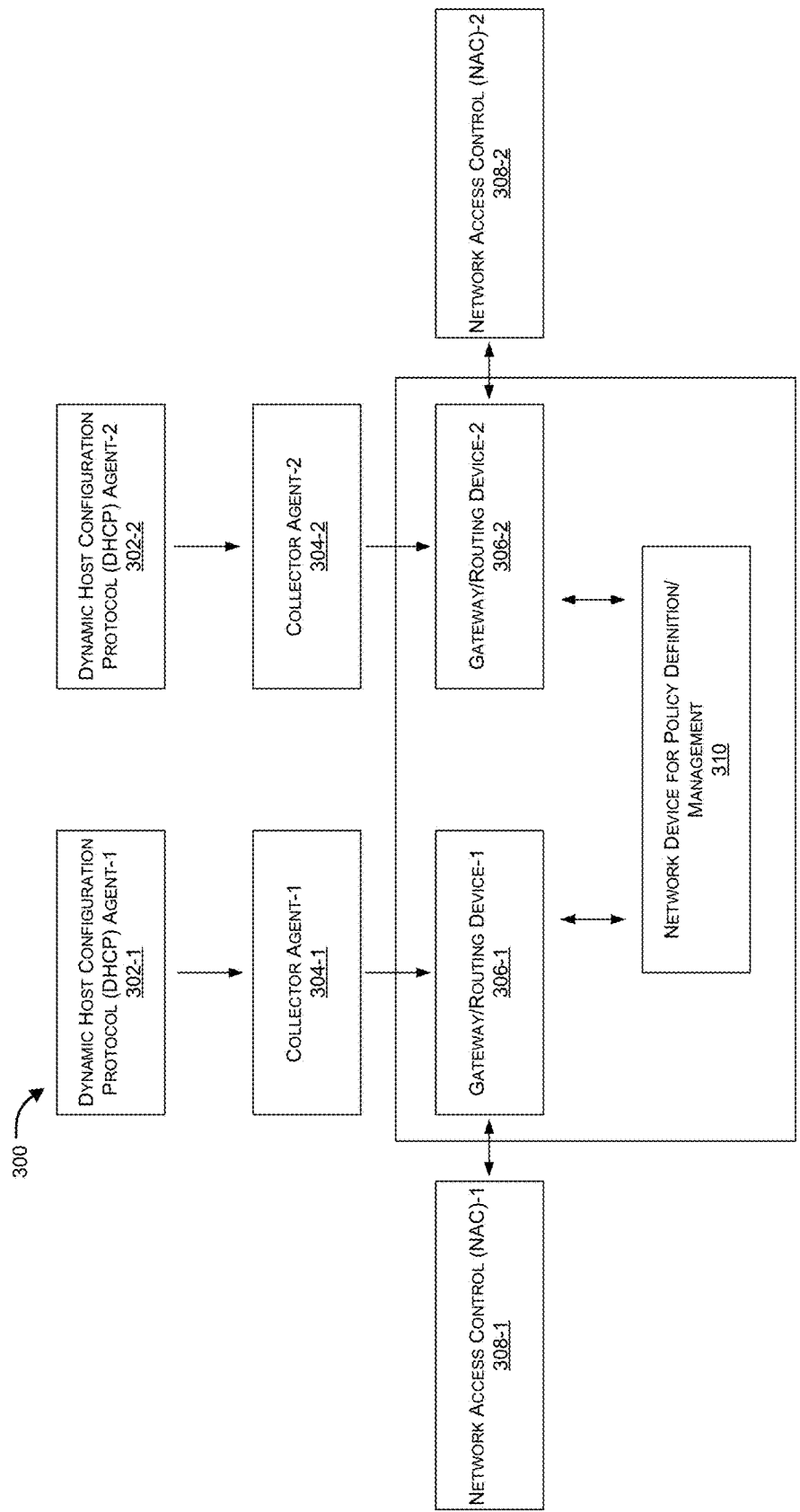
FIG. 3 illustrates an exemplary network architecture including multiple DHCP agents configured to relay DHCP lease information to respective layer 3 network security devices in accordance with an embodiment of the present invention.

FIG. 3 illustrates an exemplary network architecture 300 including multiple DHCP agents 302 configured to relay DHCP lease information to respective layer-3 network security devices 306 in accordance with an embodiment of the present invention. In this simplified example, two DHCP agents 302-1 and 302-1, which can be operatively coupled with one or more host devices (not shown) to retrieve their respective physical/MAC addresses and map such physical addresses with IP addresses that are assigned to the host devices by a DHCP server (not shown). DHCP agents 302 can also be operatively coupled to the DHCP server to update the mapping of physical address to IP address in real-time/dynamically.

In an aspect, the physical addresses and their mapping information with assigned IP addresses can be sent by DHCP agents 302 to respective collector agents 304 (302-1 to 304-1 and 302-2 to 304-2) in the form of relay lease information, wherein collector agents 304 can then (with or without pre-processing, such as aggregation with authentication information) send the relay lease information having MAC address mapping of host devices to one or more network devices 306, such as gateway devices 306-1 and 306-2. Network/security devices 306 can then process the received lease information, and enable packet processing/filtering based on one or more security/policy rules that can be defined based on the physical addresses of host devices. In this manner, even if an IP address assigned to a host device changes, the security policy for the device remains intact and can be applied efficiently by network device 306. Therefore, network device 306 can apply network access control 308, and can also define one or more security/management policies 310 for the host devices.

FIGS. 4A-D collectively illustrate how assignment of an IP address to a MAC address and changes thereto are tracked by a layer 3 network device in accordance with an embodiment of the present invention. As shown, at representation 400, a mapping between physical addresses and corresponding IP addresses for one or more hosts can be maintained by the DHCP agent. For instance, a host device having a currently assigned IP address 192.168.1.181 can have a physical/MAC address of 00-AC-1C-14-F9-0B.

At 420, such mapping information can be sent to a network device, which can then, based on the received physical addresses, assign one or more policy rules to the host devices. For instance, a host device having a physical address 00-AC-2B-D5-C7-F4 can be assigned a policy Rule_645, and another host device having a physical address 00-AC-20-9B-B3-54 can be assigned a policy Rule_726.

At 440, a change in IP address of one or more hosts can be immediately updated in the mapping information maintained by the DHCP agent. For instance, as can be seen in the first row, the IP address of a given host changes from 192.168.0.181 to 192.168.0.170 without impacting the static MAC address. At 460, such a change can be reported at periodic intervals or in real-time to the network device by the DHCP agent so that the mapping can be updated at the network device without any need to revise the security policy/rule applied to that host as the rule is based on the layer-2 information (e.g., the physical/MAC addresses of the host systems).

Figure 5:
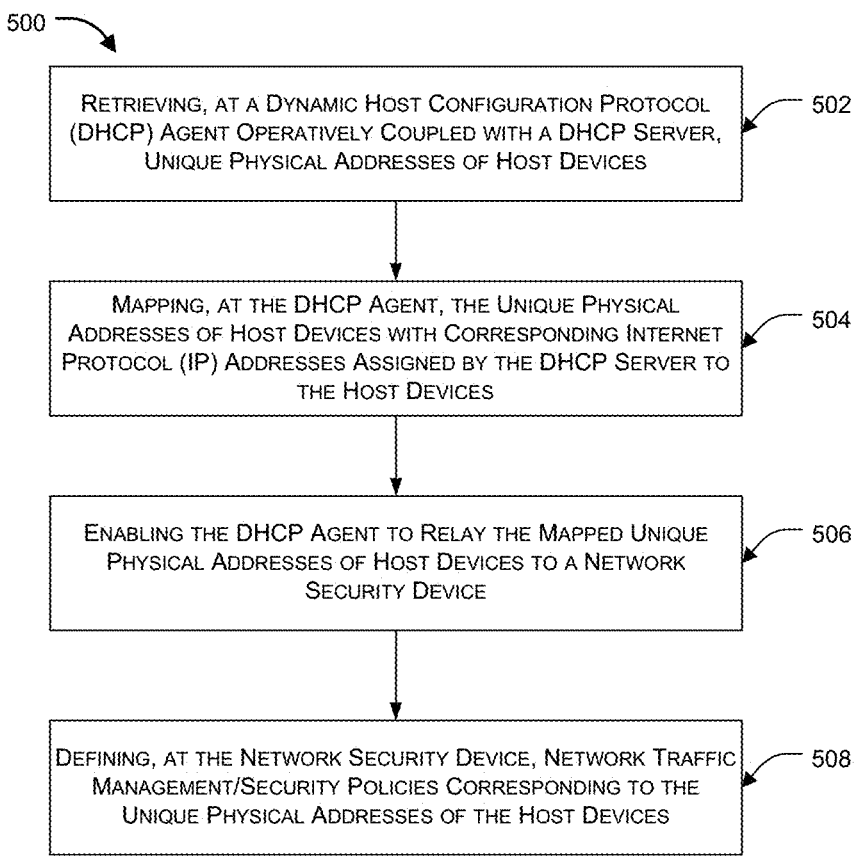
FIG. 5 is a flow diagram illustrating network access control processing making use of relayed DHCP lease information in accordance with an embodiment of the present invention.

FIG. 5 is a flow diagram 500 illustrating network access control processing making use of relayed DHCP lease information in accordance with an embodiment of the present invention. In an aspect, at step 502, a dynamic host configuration protocol (DHCP) agent that is operatively coupled with a DHCP server receives unique physical addresses (e.g., MAC addresses) of one or more host devices. At step 504, the received physical addresses are mapped to corresponding Internet Protocol (IP) addresses assigned by the DHCP server to the one or more host devices. At step 506, the DHCP agent relays the mapped unique physical addresses of one or more host devices to a network security device. At step 508, network traffic management/security policies can be defined, at the network security device, by a network administrator, for example, in terms of the unique physical addresses of the one or more host devices.

In an aspect, the method can further include the step of managing traffic to/from the one or more host devices based on corresponding network traffic management/security policies. In yet another aspect, the network security device can be any or a combination of a firewall, a gateway device, a switch, a router, and a traffic management/control device. In yet another aspect, the network security device can update the mapping between IP addresses and physical addresses of the one or more host devices in real-time based on relay information received from the DHCP agent. In another aspect, the network traffic management/security policies can be configured to perform any or a combination of NAC, identifying/quarantining of host devices that violate policies, and logging and reporting information.

Figure 6:
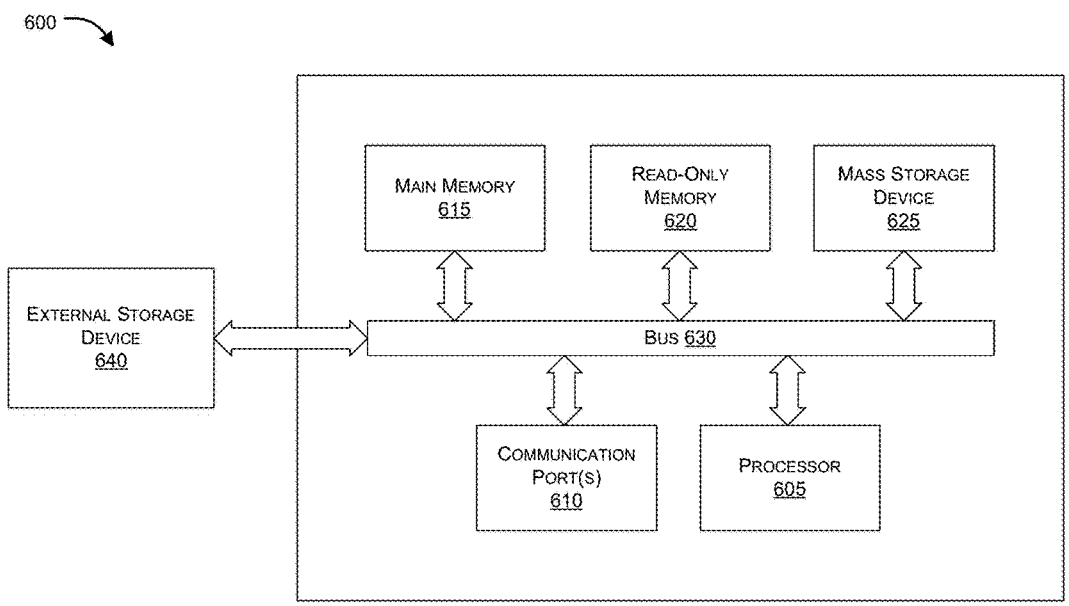
FIG. 6 is an exemplary computer system in which or with which embodiments of the present invention may be utilized.

FIG. 6 is an exemplary computer system in which or with which embodiments of the present invention may be utilized. Computer system 600 may represent or form a part of a DHCP server (e.g., DHCP server 106), a DHCP agent (e.g., DHCP agent 104), a collector agent (e.g., collector agent 108) a network security device (e.g., layer-3 network device 112), a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A system comprising:
a network security device protecting a private network, wherein the network security devices comprises:
a first non-transitory storage device having embodied therein one or more modules; and
a first set of one or more processors coupled to the first non-transitory storage device and operable to execute the one or more modules, wherein the one or more modules include a physical address based network policy definition module; and
a dynamic host configuration protocol (DHCP) agent, within the private network, coupled with a DHCP server, wherein the DHCP agent comprises:
a second non-transitory storage device having embodied therein a plurality of modules; and
a second set of one or more processors coupled to the second non-transitory storage device and operable to execute the plurality of modules, wherein the plurality of modules include:
a physical address collection module which when executed by the second set of one or more processors, receives unique physical addresses of one or more host devices associated with the private network and maps them with corresponding Internet Protocol (IP) addresses assigned by the DHCP server to the one or more host devices; and
a physical address information forwarding module, which when executed by the second set of one or more processors, enables the DHCP agent to relay the mapped unique physical addresses of one or more host devices to the network security device; and
when the physical address based network policy definition module is executed by the first set of one or more processors, the physical address based network policy definition module defines network traffic management/security policies corresponding to at least one of the unique physical addresses of said one or more host devices.

2. The system of claim 1, wherein the one or more modules further comprise a network policy based traffic management module, which when executed by the first set of one or more processors, manages traffic to/from the one or more host devices based on corresponding network traffic management/security policies.

3. The system of claim 1, wherein the network security device is any or a combination of a firewall, a gateway device, a switch, and a traffic management/control device.

4. The system of claim 1, wherein the unique physical addresses comprise Media Access Control (MAC) addresses of the one or more host devices.

5. The system of claim 1, wherein the network security device updates the mapping between IP addresses and physical addresses of the one or more host devices in real-time based on relay information received from the DHCP agent.

6. The system of claim 1, wherein said network traffic management/security policies are configured to perform any or a combination of network access control (NAC), identifying/quarantining of host devices that violate policies, and logging and reporting information.

7. The system of claim 1, further comprising at least one collector agent logically interposed between the DCHP agent and the network security device and configured to collect DCHP lease information transmitted by the DHCP agent and forward it to the network security device.

8. The system of claim 1, wherein the at least collector agent aggregates the DHCP lease information with corresponding authentication information before forwarding the aggregated information to the network security device.

9. A method comprising:
retrieving, by a dynamic host configuration protocol (DHCP) agent associated with a private network that is operatively coupled with a DHCP server, unique physical addresses of one or more host devices associated with the private network and mapping them to corresponding Internet Protocol (IP) addresses assigned by the DHCP server to the one or more host devices;
enabling the DHCP agent to relay the mapped unique physical addresses of one or more host devices to a network security device protecting the private network;
defining, by the network security device, network traffic management/security policies corresponding to at least one of the unique physical addresses of the one or more host devices.

10. The method of claim 9, further comprising managing, by the network security device, traffic to/from the one or more host devices based on the defined network traffic management/security policies.

11. The method of claim 9, wherein said network security device comprises any or a combination of a firewall, a gateway device, a switch, and a traffic management/control device.

12. The method of claim 9, wherein the unique physical addresses comprise Media Access Control (MAC) addresses of the one or more host devices.

13. The method of claim 9, further comprising updating, by the network security device, the mapping between IP addresses and physical addresses of the one or more host devices in real-time based on DHCP lease information received directly or indirectly from the DHCP agent.

14. The method of claim 9, further comprising performing, by the network security device, one or more of network access control (NAC), identifying/quarantining of host devices that violate policies, and logging and reporting of information based on the network traffic management/security policies.

15. The method of claim 9, further comprising collecting, by at least one collector agent logically interposed between the DHCP agent and the network security device, DHCP lease information including mapped unique physical addresses and forwarding the DHCP lease information to the network security device.

16. The method of claim 15, wherein said forwarding the DHCP lease information comprises aggregating, by the at least one collector agent, the DHCP information with corresponding authentication information before forwarding the aggregated information to the network security device.

* * * * *